F. A. VASTANO

STARTER FOR INTERNAL COMBUSTION MOTORS

Aug. 2, 1932. Re. 18,554

Original Filed Aug. 24, 1927 2 Sheets-Sheet 1

WITNESS

Wm. V. Bell

INVENTOR,
Fred A. Vastano,
BY
John Rennard
ATTORNEY

F. A. VASTANO

Aug. 2, 1932. STARTER FOR INTERNAL COMBUSTION MOTORS Re. 18,554

Original Filed Aug. 24, 1927 2 Sheets-Sheet 2

WITNESS

Wm. V. Bell

INVENTOR,

Fred. A. Vastano,

BY

John Perward

ATTORNEY.

Reissued Aug. 2, 1932

Re. 18,554

UNITED STATES PATENT OFFICE

FREDERICK A. VASTANO, OF PATERSON, NEW JERSEY, ASSIGNOR, BY MESNE ASSIGNMENTS, TO ECLIPSE AVIATION CORPORATION, OF EAST ORANGE, NEW JERSEY, A CORPORATION OF NEW JERSEY

STARTER FOR INTERNAL-COMBUSTION MOTORS

Original No. 1,700,750, dated February 5, 1929 Serial No. 215,073, filed August 24, 1927. Application for reissue filed February 3, 1931. Serial No. 513,237.

This invention relates to starting means for internal combustion motors and has in view in particular to provide a starting means for so-called "kickers", or outboard motors used in propelling small boats which may be applied to existing types of such motors without considerable change in their construction and which shall be simple, reliable, and easily operated.

Given the rotary element (of the internal combustion motor) to be started and provided with a clutch portion, my invention broadly contemplates the combination therewith of an electric circuit having a source of energy and also a break therein, an electric motor in the circuit, and means shiftable to close the circuit and thereupon transmit rotation from the motor to said element including a clutching member driven by the motor and shiftable as a part of said means into clutching engagement with said clutch portion of the latter. In the specific embodiment herein set forth, said means also includes, with said member, a device whose special function it is to close the circuit as well as cause the shifting of said member. In the simplest and otherwise best form the clutching member is coaxial with said element and shiftable lengthwise of its axis.

At the rear of the boat 1 is mounted the internal combustion motor or "kicker" 2, with its main or propeller shaft 3 upright, such motor as shown being of a well known type. The shaft 3 has suitably affixed on its upper end the fly-wheel 4, and they together form the aforesaid rotary element of the motor, the remaining parts of which, being well known and having no particular bearing on the present invention, require no description herein. The shaft 3 usually has a threaded upper end 3*a* protruding from the flywheel and receiving a nut which bears upon the latter. In place of this nut I screw on said threaded end 3*a* a tubular shaft-extension or post 5 having a top wall 5*a* with a central opening 5*b* therein.

Figure 1:
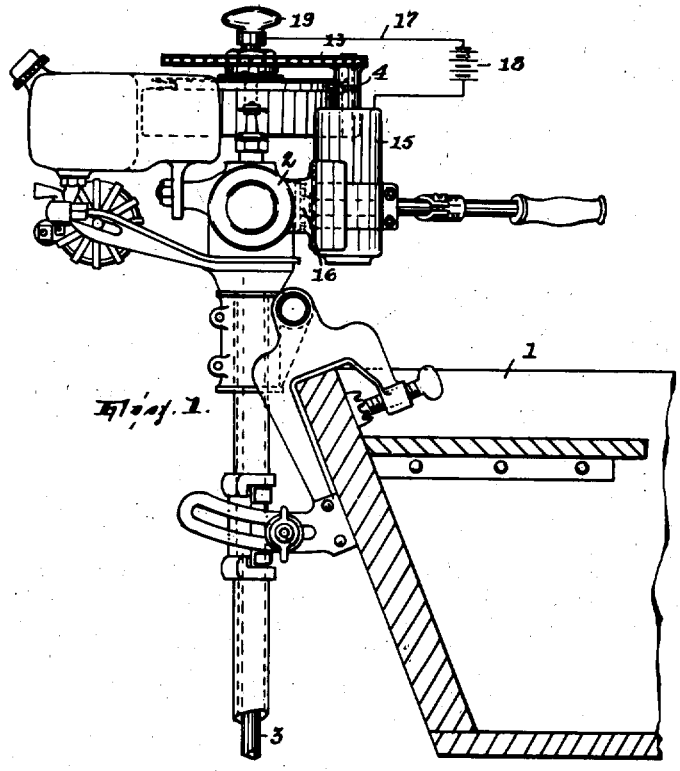
Fig. 1 is a side elevation of a motor having my starting means and applied to a boat, which partly appears, in section.
Figure 2:
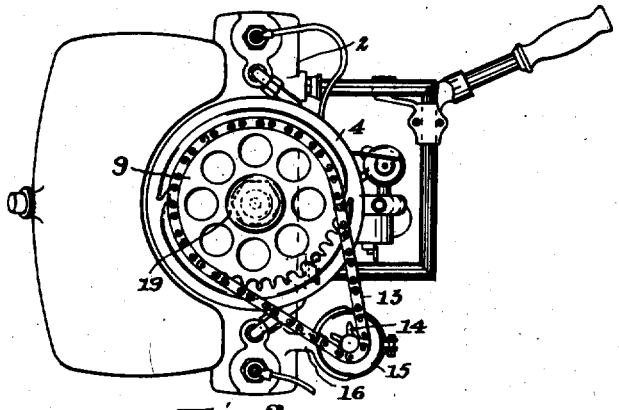
Fig. 2 is a plan, the boat being omitted.
Figure 3:
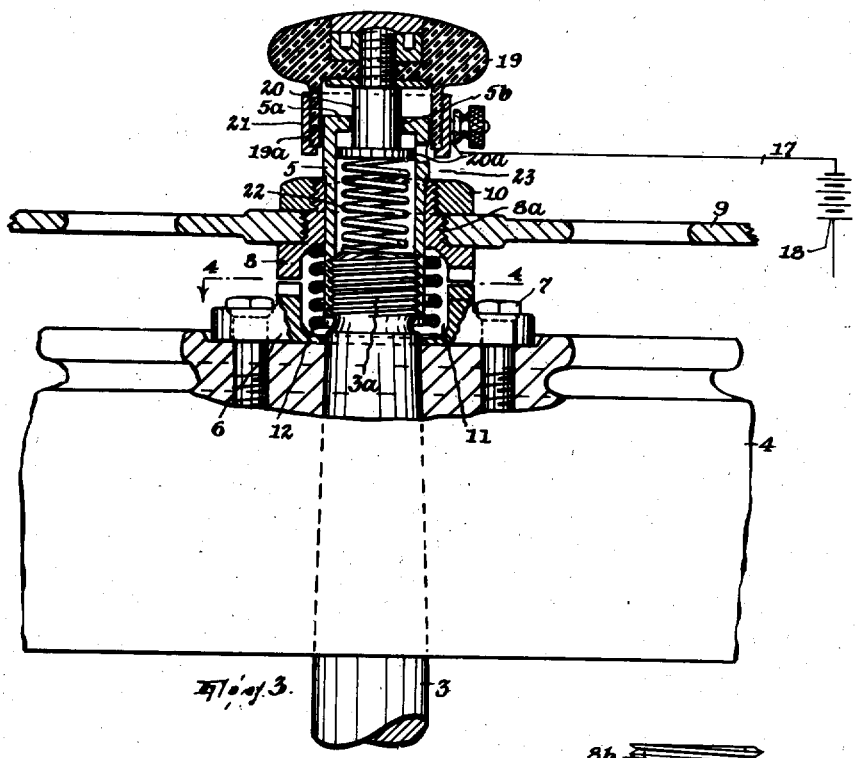
Fig. 3 shows the principal parts of my invention on a larger scale and mainly in section.
Figure 4:
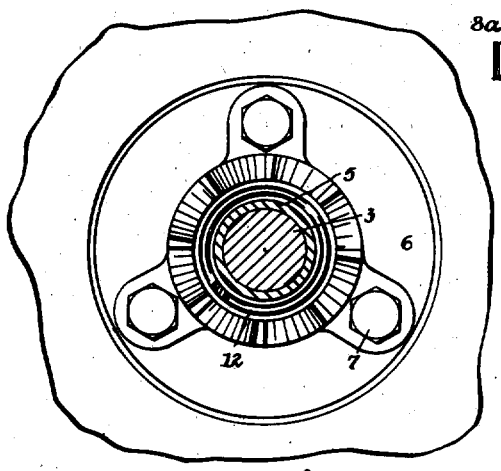
Fig. 4 is a section on line 4—4, Fig. 3.
Figure 5:
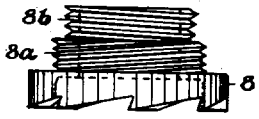
Fig. 5 shows a detail.

On said rotary element is secured a clutch-piece 6, here shown held to the fly-wheel by cap-screws 7. Also on said element but revoluble and also longitudinally shiftable thereon is the aforesaid rotary member driven by the electric motor; in the present example this comprises a clutch-piece 8 (to engage clutch-piece 6) having a threaded major extension 8*a*, a sprocket-wheel 9 screwed fast on the extension 8*a*, and a lock-nut 10 (to secure the sprocket in place) screwed on a further or minor and reversely threaded (Fig. 5) extension 8*b* of the clutch-piece 8. Said member and element together afford a housing 11 (around the protruding part of the shaft) and this contains a spiral spring 12 which normally holds the clutching portion of said member clear of that of said element, as shown in Fig. 3. Assuming said rotary member to be driven, on forcing the same toward the fly-wheel said member and element will be clutched together and the latter driven by the former.

The clutching member formed by the sprocket wheel and its clutch-piece 8 is driven, through a chain 13, by a sprocket wheel 14 on or forming a part of the rotor of an electric motor 15 which it will be convenient to mount in a bracket 16 projecting from a fixed part, as the casing, of the motor 2. This motor is in a circuit 17 having a source of electric energy 18 and a break (to be indicated in the circuit).

For closing the circuit and shifting said clutching member into clutching engagement with the clutch portion of said rotary element 4—6 I provide a knob. This includes the knob proper 19 of insulating material, a headed central stem 20 projecting downwardly therefrom, and a metal collar 21 embracing the depending flange 19*a* of the knob-proper. The knob-proper caps the upper end of the shaft extension, with the stem 20 reaching through opening 5*b* thereof and its head 20*a* below wall 5*a* and so retaining the knob in place. The stem of the knob is seated on a spiral spring 22 housed in the shaft-extension, and of less resistance than spring 11. Collar 21 forms one terminal of the mentioned circuit and some other metal part of the mechanism normally insulated from the collar by the flange 19*a* may form the other terminal, leaving (normally) the aforesaid break in the circuit at 23, Fig. 3.

When the means including the knob (which is in effect swivelled on said rotary element) and said clutching member is shifted downwardly as by pressure being exerted on the knob until it contacts with and then depresses said member, the circuit will be closed (starting the motor 15) and the clutching portions engaged with each other, whereby the motor 15 will impart rotary impulse to the motor 2 to start the same.

Having thus fully described my invention, what I claim is:

1. In combination, the rotary element to be started rotating and having a clutch portion, an electric circuit having a source of energy and also a break therein, an electric motor in the circuit, a rotary clutching member driven by the motor and shiftable into clutching engagement with said clutch portion, and a knob coaxial with said element and movable lengthwise of its axis to close the circuit and shift said member into such engagement.

2. In combination, the rotary element to be started rotating and having a clutch portion, a rotary clutching member, means to rotate said member, said member being shiftable into clutch-engagement with said portion to start said element rotating, and a knob movable to cause such shifting of said member swivelled and arranged concentrically with respect to said element.

3. In combination, the rotary element to be started rotating and having a clutch portion and an extension projecting centrally of said portion, a clutching member revoluble on said extension and shiftable thereon into and out of interlocking engagement with said portion, a driving motor, a circuit to said motor, a switch element in said circuit, and means for moving said switch element into contact with said clutching member to energize said motor and, by the pressure of such contact, shift said clutching member into engaging position.

4. In a starter for an outboard motor, a clutch member secured to the flywheel of the motor, a clutch member adapted to engage said first named clutch member, yielding means normally operative to hold said clutch members in disengaged position, a sprocket member operatively connected to said second named clutch member, power means for driving the sprocket member, and common means for rendering the power means operative and for moving the sprocket member and the clutch member secured thereto into driving relation with the first named clutch member, said means including a current conducting element adapted to contact an integral part of said second named clutch member.

5. In combination with an outboard engine of the type employed on boats, an electric motor mounted on said engine, a transmission wheel driven by the motor, a combined transmission wheel and clutch member adapted to be driven by the first named wheel, a flexible looped member drivably connecting said wheels, a toothed clutch member carried by the engine, and means comprising a substantially cylindrical current conducting element shiftable along the axis of rotation of the combined wheel and clutch member for closing the circuit to the motor and moving the combined transmission and clutch member to operative position.

6. In combination with an outboard engine of the type employed on boats, an electric motor mounted on said engine, a clutch member adapted to be driven by the motor, a clutch member carried by the engine, and means for closing the circuit to the motor and moving the first named clutch member to operative position, said means including a current conducting element held fast to said clutch member.

7. In combination with a rotatable element of an engine to be cranked, a clutch member normally disengaged from said element, a gear secured to said clutch member, a locking member for maintaining said gear and clutch in operative relation, electrical power means for actuating said gear and clutch, and means engageable with said locking means for closing the circuit to said electrical power means.

8. In combination with a rotatable element of an engine to be cranked, a clutch member normally disengaged from said element, a gear secured to said clutch member, a locking member for maintaining said gear and clutch member in operative relation, electrical power means for actuating said gear and clutch, and means engageable with said locking means for connecting said clutch member to said rotatable element and at the same time closing a circuit through said locking member to energize said electrical power means.

9. In combination with a rotatable element of an engine to be cranked, said element having a clutch member secured thereto, a complemental clutch member normally disengaged from said first named clutch member, a gear secured to said complemental clutch member, electrical power means for actuating said gear and clutch member, and means engageable with said gear for meshing said clutch members and at the same time closing a circuit through said gear to energize said electrical power means.

In testimony whereof I have signed this specification.

FREDERICK A. VASTANO.